Nov. 2, 1965
E. E. OLSON ETAL
3,214,871
APPARATUS AND METHOD FOR TREATING COATED
ELECTRODES AND THE LIKE
Filed March 20, 1963
2 Sheets-Sheet 1
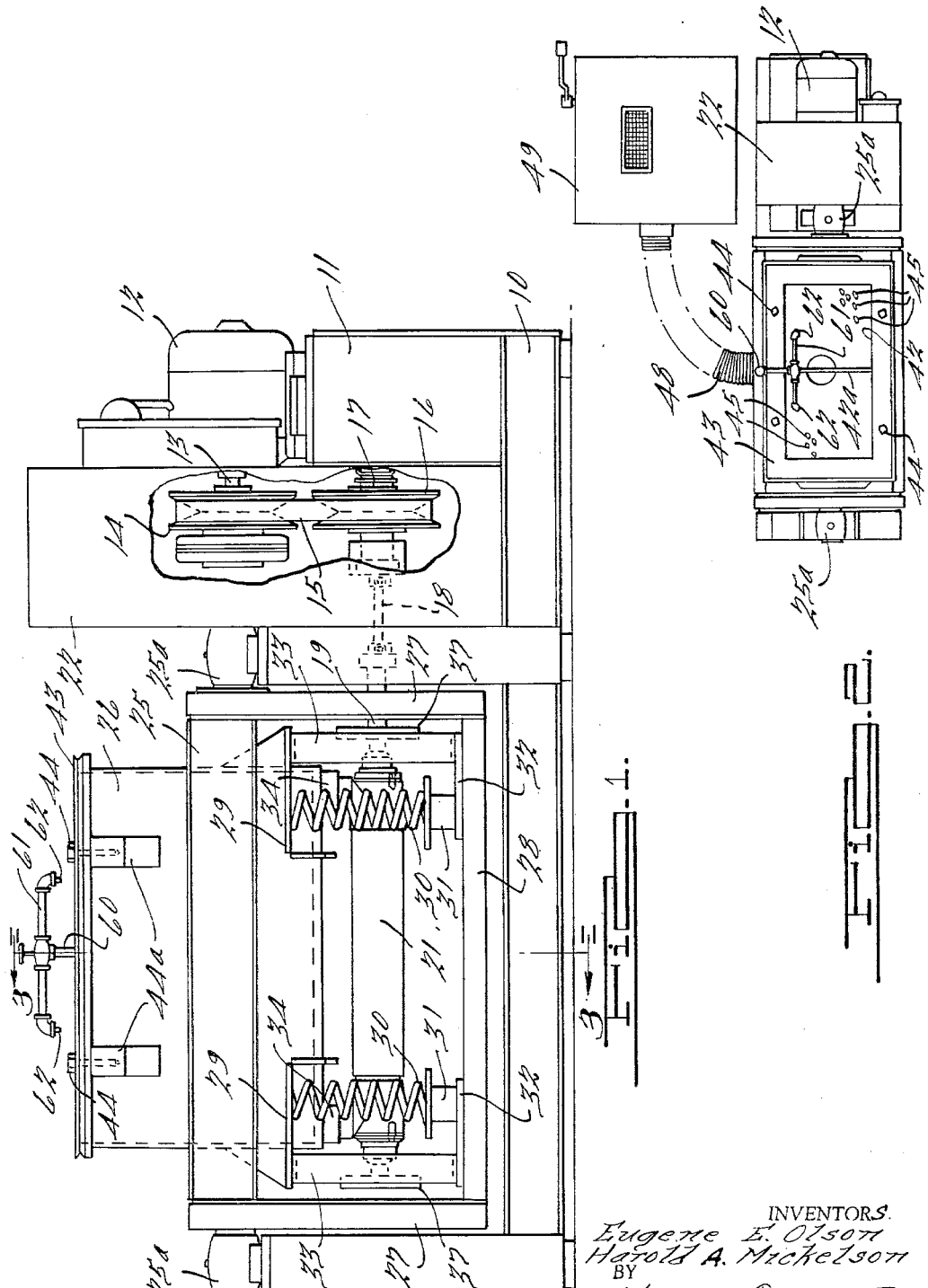
INVENTORS.
Eugene E. Olson
Harold A. Mickelson
BY
Karness, Dickey & Pierce
ATTORNEYS Nov. 2, 1965   E. E. OLSON ETAL   3,214,871
APPARATUS AND METHOD FOR TREATING COATED
ELECTRODES AND THE LIKE
Filed March 20, 1963   2 Sheets-Sheet 2
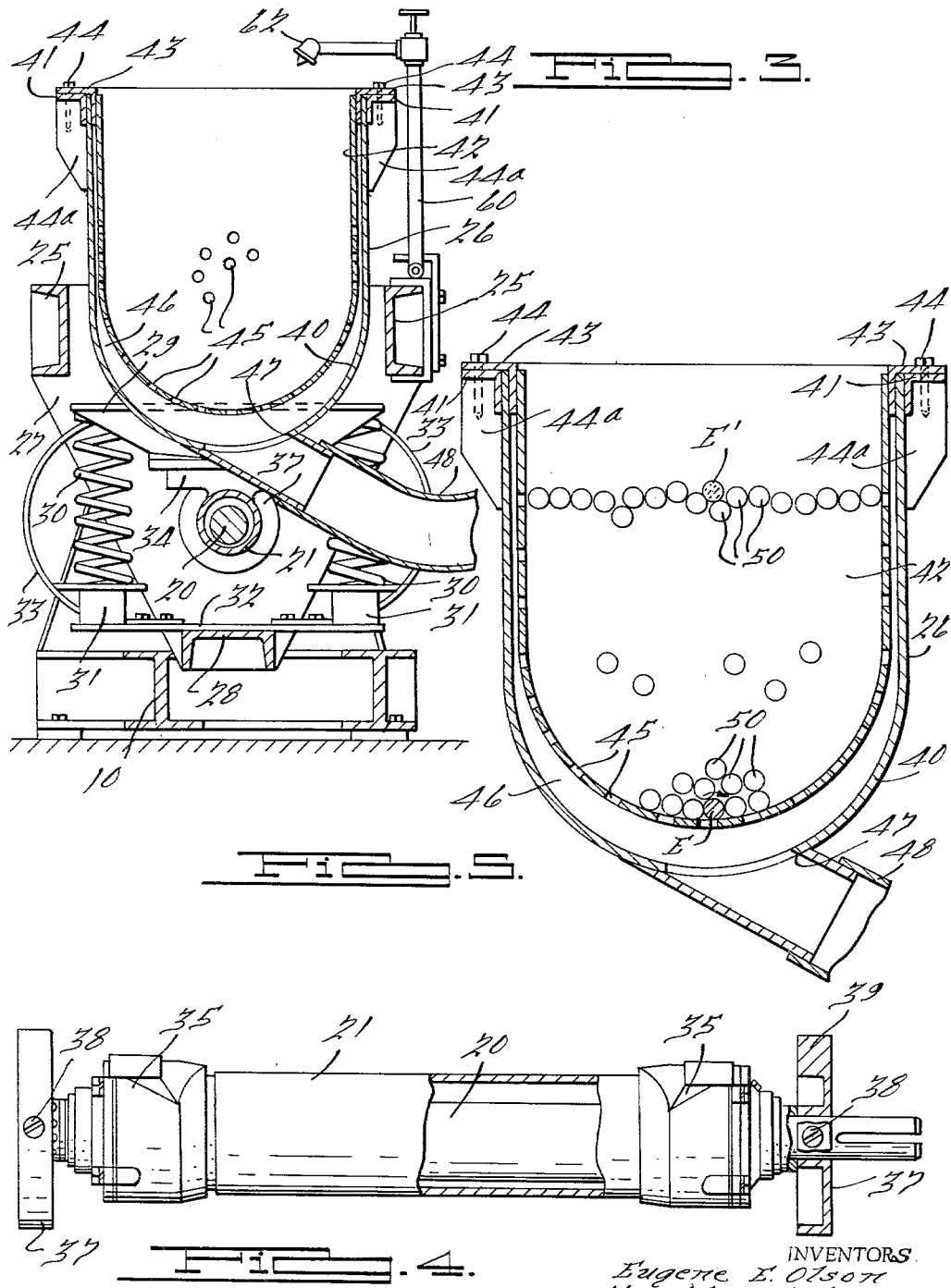

United States Patent Office 3,214,871
Patented Nov. 2, 1965

3,214,871
APPARATUS AND METHOD FOR TREATING COATED ELECTRODES AND THE LIKE
Eugene E. Olson and Harold A. Mickelson, Albert Lea, Minn., assignors to King-Seeley Thermos Co., Ann Arbor, Mich., a corporation of Michigan
Filed Mar. 20, 1963, Ser. No. 266,664
3 Claims. (Cl. 51—316)

This invention relates to an apparatus and method for treating rods or coated electrodes and the like and, more particularly, to improvements in such apparatus and method whereby surface coatings on the rods may be effectively removed. More especially, this invention relates to means for decoating the flux from welding electrodes which are found to be defective because of lack of concentricity, irregular coating, etc.

In its preferred form, this invention contemplates the provision of means for recovering the decoated flux and for so effectively cleaning the rod or electrode that it is in excellent condition for passing through an extrusion machine for recoating, thus resulting in both the wire and flux being salvaged. The reclaimed flux can then be remixed with other batches of the same type of flux and reused.

In carrying out this invention, there is provided a vibratory machine having a tub or container, the vibratory movement of which may be controlled to produce an efficient vibratory action upon the contents thereof through an eccentric shaft located beneath the tub or container and operatively connected thereto whereby the path of travel of the container traces a substantially rotary or oval-shaped path, inducing the desired movement of the parts within the tub or container.

A primary object of this invention is to modify a vibratory machine of this type by inserting a perforated basket provided with a rounded bottom into the tub or container having one or more compartments for receiving the electrodes which are placed therein in side-by-side contacting relation. The perforated basket is mounted within the tub or container so as to leave a clearance between the bottom of the tub or container and the basket. During the vibratory movement of the tub and basket, the electrodes will violently rub against one another while maintaining their side-by-side positions in the basket, thereby causing the flux to be rubbed off. The flux will filter through the perforated basket into the bottom of the tub. A relatively large vacuum connection is provided between the bottom of the tub and any preferred type of dust collector, such, for instance, as a curtain type dust collector.

The invention also contemplates the provision of means for controlling the amount or intensity of the vibratory action so that the proper rubbing action between the rods or electrodes may be attained. The vibratory movement imparted to the basket causes each electrode to rotate about its own axis and, at the same time, to migrate about in the basket while maintaining its side-by-side position with respect to the other electrodes. This causes the electrodes to rub against one another throughout their entire circumferences, thereby causing all of the flux or other coating thereon to be completely removed.

By this method, the decoated flux is collected and drawn off constantly, and may be transferred to and deposited in a container. This pure flux can then be remixed with other batches of the same type of flux and reused, thereby salvaging all of the flux from the defective rods. Also, the decoated electrodes have been found to be completely cleaned and in condition for recoating, thereby salvaging the electrodes also.

Certain, uncommon types of high density flux are more difficult to remove from the welding rods. For use in connection with this type of welding rod, the machine is equipped with a spray header mounted directly over the tub or container and perforated basket. This header is equipped with a plurality of spray nozzles for spraying water or other liquid onto the welding electrodes as they are being vibrated. The wet sludge is drained out of the tub through the connection normally used for the dust collector and disposed of. With this method, the wire is salvaged but the flux is usually lost down the drain, because recovery thereof is expensive.

It is therefore a principal object of this invention to provide an apparatus and method for decoating defective welding rods and the like in a simple but effective manner and to provide such an apparatus and method wherein, under most conditions, the flux and wire may be salvaged and in which all types of welding rods may be decoated.

The various objects and advantages, and the novel details of construction and operation of one commercially practical embodiment of the invention, will become more apparent as this description proceeds, especially when considered in connection with the accompanying drawings, in which:

FIGURE 1 is a side elevational view of a vibrating machine incorporating this invention;

FIGURE 2 is a top plan view thereof on a smaller scale;

FIGURE 3 is a vertical transverse sectional view taken substantially on the plane indicated by line 3—3 in FIGURE 1;

FIGURE 4 is a fragmentary detail sectional elevational view of the eccentric shaft; and FIGURE 5 is a fragmentary sectional elevational view of the container and perforated basket illustrating the manner in which the welding electrodes are disposed within the perforated basket of the device.

Attainment of the objects and advantages of this invention is possible by the modification and use of any one of several of the known types of vibrating machines now commercially available. One form of vibrating machine which is effective in carrying out this invention is shown in the accompanying drawings, in which the reference character 10 indicates the base of the machine. Mounted on the base 10 is a motor support 11 upon which is mounted a motor 12 having a drive shaft 13 to which is connected a pulley or sheave 14. A belt 15 connects the sheave 14 to a sheave 16 mounted on a driven shaft 17. The driven shaft 17 is connected by means of a universal joint or coupling 18 to the shaft 19 of an eccentrically weighted shaft 20 contained in a housing 21. The driving means connecting the motor 12 to the shaft 19 is contained in a housing 22.

Vibrating machines of this type usually comprise a cradle 25 which surrounds the tub or container 26. The cradle 25 may be formed of channel bars and is connected by end members 27 to a lower, preferably channel-shaped member 28 extending between the end members 27 and connected thereto. Normally, the cradle 25, together with its tub or container 26 is tiltable about pivots 25a to empty the contents of the container but, inasmuch as this tilting action is not desirable in carrying out the present invention, the tilting mechanism has been eliminated.

Secured to the ends of the tub or container 26 are brackets 29 which form the upper supports for four coil springs 30 disposed at approximately the four corners of the container 26. The lower ends of these springs rest upon and are secured to spring supports 31 secured to platforms 32 which in turn are mounted on the lower channel-shaped member 28; see particularly FIGURE 3. Also disposed at both ends of the tub or container 26 are leaf springs 33 which extend between the bracket 29 and the platforms 32.

From the foregoing, it will be readily apparent that the tub or container 26 is supported, suspended and stabilized in the cradle 25 solely by means of the coil springs 30 and the leaf springs 33. With this spring suspension arrangement of the tub or container 26 and the universal joint or coupling 18, no appreciable vibration is transmitted from the container 26 to the driving mechanism, thereby confining substantially all of the vibratory motion to the container 26.

The eccentric shaft 20 is secured to the container 26 by means of supports 34 secured to the bearing ends 35 of the eccentric shaft assembly. Thus, rotation of the eccentric shaft 20 will vibrate the container 26. Mounted on each concentric outboard end of the eccentric shaft 20 is an adjustable counterweight 37 which is secured in any rotative adjusted position by means of a set screw 38 or the like. Each adjustable counterweight is provided with a weighted portion 39, and when properly adjusted with respect to the eccentric portions of the shaft 20 provides for changes in the vibratory amplitude of the eccentric shaft.

The drive mechanism is geared to cause the spring mounted container 26 to oscillate at a frequency of from 900 to 2100 cycles per minute, and the adjustable counterweights 37 may be adjusted so as to provide an amplitude setting of from $\frac{1}{64}$ of an inch to $\frac{1}{4}$ of an inch. Thus, the eccentric action of the shaft upon the container 26 may be controlled to obtain most efficaciously the objects of this invention.

As probably seen best in FIGURES 1 and 3, the tub or container 26 is of elongated configuration and has a curved or rounded bottom 40. The upper open peripheral edge of the tub or container 26 is provided with an outwardly extending flange 41. This flange 41 may be in the form of angle irons secured thereto.

The particular modification of the vibrating machine which forms an important part of the present invention consists in placing a perforated basket 42 within the tub or container 26. The perforated basket 42 may be provided with flanges 43 at its upper open edge, which flanges may also be in the form of angle irons. The perforated basket 42 is assembled with the container 26 by placing the same therein with the flanges 41 and 43 engaging one another and these may be secured together by suitable fastening means 44 extending into bosses 44a. The perforated basket 42 is provided with a multiplicity of perforations 45, and may be so dimensioned with respect to the container 26 as to leave a space 46 therebetween, the greater amount of space being located between the bottoms of the container 26 and the basket 42. The curved or rounded bottom 40 of the container, which is otherwise imperforate, is provided with a flanged aperture 47 to which a flexible tube 48 is connected which leads to a suitable dust collector 49; see particularly FIGURE 2. Any desired type of dust collector may be employed, but a curtain type dust collector has been found to be quite acceptable.

It will be obvious that when the tub or container 26 is vibrated by means of the eccentric shaft 20, the perforated basket and its contents, yet to be described, will be vibrated at the same amplitude controlled by the adjustable counterweights 37.

If desired, the inside of the perforated basket 42 may be compartmentized by selectively positioning any number of suitably spaced dividers or partitions 42a therein; see FIGURE 2. Thus, the interior of the basket may be provided with the correct number of compartments for accommodating welding electrodes of various lengths, these electrodes usually being produced in lengths of 9", 12", 14" and 18".

In FIGURE 5, there is illustrated schematically a plurality of coated welding electrodes 50 which are adapted to be placed in the perforated basket 42 in side-by-side contacting relation. The basket is provided with a rounded or curved bottom as shown in FIGURES 3 and 5. As stated heretofore, the container 26 and the perforated basket or container 42 oscillate at a frequency of from 900 to 2100 cycles per minute with an adjustable amplitude of from $\frac{1}{64}$ to $\frac{1}{4}$ of an inch. The path of travel of the container traces a substantially rotary or oval-shaped path, inducing movement of the contents thereof, here shown as welding electrodes, relative to one another and relative to the basket 42. For instance, this vibrating movement of the basket causes each electrode to rotate about its own axis and violently rub against the adjacent electrodes, and, at the same time, to migrate about in the basket while maintaining its side-by-side position with respect to the other electrodes. This causes the electrodes to rub against one another throughout their entire circumference, thereby causing all the flux or other coating thereon to be completely removed. For instance, an electrode such as shown at E located at the bottom of the basket 42 will be rotated about its axis in contact with the adjacent electrodes and, at the same time, will migrate within the basket so that it may end up at the position indicated by the reference character E'. Inasmuch as the electrodes are laid in side-by-side relation in the compartment or compartments of the basket 42, they will maintain this side-by-side relation so that each electrode will contact its neighbors throughout its length during the entire vibratory motion of the basket 42.

The flux or other coating which is rubbed off will filter through the apertures 45 in the basket 42 and collect in the space 46 adjacent the bottom of the imperforate container 26 whereby it may be removed by the dust collector 49 through the tube 48 and outlet 47 in the bottom of the container 26. Thus, all of the reclaimed flux can be salvaged and later mixed with other batches of the same type of flux and reused. It has also been found that the welding rods are so effectively cleaned that they are in condition to be passed through an extrusion machine for recoating with flux. Thus, both the rods and flux are salvaged.

Certain, uncommon types of high density flux are more difficult to remove from the welding rods than the customary type of flux. For use in removing this type of flux, there is provided a fluid spray pipe 60 connected to a suitable source of fluid (not shown) and connected to a spray header 61 equipped with a plurality of spray nozzles 62 located directly over the perforated basket 42. Thus, water or other suitable liquid may be sprayed onto the welding electrodes as they are being vibrated to assist in removing the flux therefrom. The wet sludge is drained out through the aperture 47 into a waste receptacle (not shown), the tube 48 of the dust collector, of course, being first removed. With this method, the welding rods are salvaged, but the flux is usually lost, because recovery thereof is too expensive.

From the foregoing, it will be apparent there has been provided an economical method and apparatus for decoating the flux from the welding electrodes or coatings from other types of rods, which is not only simple and effective, but highly efficient. Experience has shown that the time cycle required for removing all of the flux from a given batch of electrodes may run from thirty minutes to one hour. Therefore, a great number of loads can be processed during a work day. Also of importance is that during normal operations, all of the flux may be reclaimed and the welding rods are removed from the machine in excellent condition for recoating with flux. Thus, both the welding rods and the flux may be salvaged.

While one commercially practical embodiment of the invention has been described and illustrated herein somewhat in detail, it will be understood that various changes may be made as may come within the purview of the accompanying claims.

What is claimed is:

1. The method of decoating elongated round welding electrodes which are coated with a flux which consists of placing the welding electrodes in side-by-side contacting generally endwise aligned relation in a perforated basket having a rounded bottom, mounting said basket in a container to provide a clearance therebetween, effecting a controlled vibration of said basket and container in an orbital path in a plane at right angles to the axes of the electrodes to cause said electrodes to rotate and contact one another with a rubbing action to cause said flux to be removed from said electrodes by said rubbing action, collecting said flux in said container and withdrawing said flux from said container.

2. The method of decoating elongated welding electrodes which are coated with a flux which consists of placing the welding electrodes in side-by-side contacting generally endwise aligned relation in a perforated basket which is provided with a rounded bottom, mounting said basket in a container to provide a clearance therebetween, effecting a controlled vibration of said basket and container in a plane at right angles to the axes of the electrodes to cause said electrodes to rotate about their axes in contact with one another and to migrate about in said basket to produce a rubbing action in the absence of abrasive material to cause said flux to be removed from said electrodes, collecting said flux in said container, and withdrawing said flux from said container for reuse.

3. The method of decoating elongated round welding electrodes and the like which are coated with a flux which consists of placing the welding electrodes in side-by-side contacting generally endwise aligned relation in a perforated basket having a rounded bottom, mounting said basket in a container to provide a clearance therebetween, effecting a controlled vibration of said basket and container in a plane at right angles to the axes of the electrodes to cause said electrodes to rotate and contact one another with a rubbing action to cause said flux to be removed from said electrodes and to pass from said basket into said container, spraying a liquid onto said electrodes during the decoating operation and removing the liquid and decoating flux from said container during the decoating operation.

References Cited by the Examiner
UNITED STATES PATENTS

| | | | |
|---|---|---|---|
| 2,174,880 | 10/39 | Hilbish et al. | 51—313 |
| 2,422,786 | 6/47 | Keefer | 51—313 |
| 2,831,576 | 4/58 | Wehner | 51—163 |
| 2,973,606 | 3/61 | Brandt | 51—163 |

ROBERT C. RIORDON, *Primary Examiner.*

CHARLES A. WILLMUTH, LESTER M. SWINGLE,
*Examiners.*